United States Patent [19]

de Vries

[11] Patent Number: 4,600,223
[45] Date of Patent: Jul. 15, 1986

[54] TUBE COUPLING

[76] Inventor: Robert de Vries, 38 Archimedesstraat, 2517 RW The Hague, Netherlands

[21] Appl. No.: 697,336

[22] Filed: Feb. 1, 1985

Related U.S. Application Data

[63] Continuation of Ser. No. 420,866, Sep. 21, 1982, abandoned.

[51] Int. Cl.[4] .............................................. F16L 39/00
[52] U.S. Cl. .................................... 285/319; 285/308; 285/921
[58] Field of Search ....... 285/308, 309, 319, DIG. 22, 285/321, 340

[56] References Cited

U.S. PATENT DOCUMENTS

| 737,357 | 8/1903 | Crump et al. | 285/319 X |
|---|---|---|---|
| 3,389,923 | 6/1968 | Love et al. | 285/321 |
| 3,826,523 | 7/1974 | Eschbaugh | 285/DIG. 22 |
| 3,976,314 | 8/1976 | Graham | 285/340 X |
| 4,073,514 | 2/1978 | Pate | 285/340 X |
| 4,105,226 | 8/1978 | Frey et al. | 285/319 X |
| 4,209,193 | 6/1980 | Ahlstone | 285/309 |

FOREIGN PATENT DOCUMENTS 1097465  7/1955  France ............................... 285/308

Primary Examiner—Dave W. Arola
Attorney, Agent, or Firm—Lester Horwitz

[57] ABSTRACT

A tube coupling with snap action for quick interfitting of tubes or tubular articles.

4 Claims, 3 Drawing Figures

TUBE COUPLING

This is a continuation of co-pending application Ser. No. 420,866 filed on Sept. 21, 1982 and now abandoned.

BACKGROUND OF THE INVENTION

This invention relates to a tube coupling, with the end of one tube section to be inserted in the opposed end of the other tube section and said tube ends then to be fixed.

The known tube coupling of this type mostly comprises a bolt flange connection between the tube sections, but each time having to arrange and tighten bolts when mounting, and loosening them again for dismounting is cumbersome, and such a bolt flange connection is easily to be released by unauthorized persons, as a further disadvantage, whereas the far outwardly projecting flanges in certain cases can also be undesirable, for example when an elongated tube conduit consisting of coupled sections is to be pushed through a mounting aperture narrowly enclosing the tube.

SUMMARY OF THE INVENTION

The present invention obviates said disadvantages and thereto provides a tube coupling of the mentioned type with a substantially axial recess formed between the ends of the tube sections to be coupled, with a spring segment sleeve therein, having outwardly, and inwardly, respectively, somewhat tapered spring segments or fingers each time cooperating with a shoulder on the outer, and the inner, respectively, of the tube ends under snap action to interconnect the tube ends. This novel snap coupling operates simply and quickly and is to be constructed with a much smaller diameter, preferably with no outwardly projecting parts, than a bolt flange coupling. Fixedly snapping simply occurs in that the respective spring fingers have outwardly, and inwardly, respectively, turned edges, and therewith in an efficient manner also the sealing can be provided by a gland or annular seal which is oppressed under the snap action.

For dismounting serve through-going screw openings in the wall of the tube end defining said recess on the outer side, with tap screws therein for forcedly releasing the spring fingers to effect disconnection of the tube sections, or alternatively a segmental flange on the outer spring segment sleeve end, with said flange projecting outwardly of the tubes in order to by radially pressing it inwardly effect disconnection of the tube sections. The simultaneously radially forcing all spring fingers of the spring segment sleeve inwardly can therewith occur by means of an oppressible hoop around the seal.

This new tube coupling thus lends itself pre-eminently for a quick mounting and dismounting of tube sections.

The invention is explained in more detail in the following in view of illustrative embodiments thereof as represented in the drawing.

DESCRIPTION OF THE PREFERRED EMBODIMENTS

Figure 1:
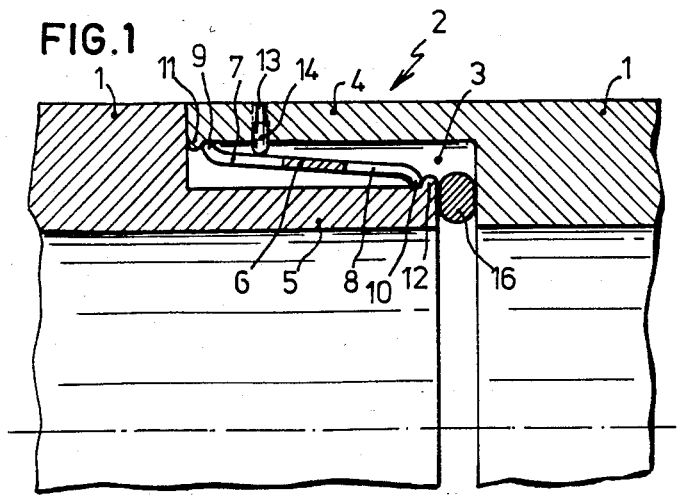
FIG. 1 is an axial section of the new tube coupling.
Figure 2:
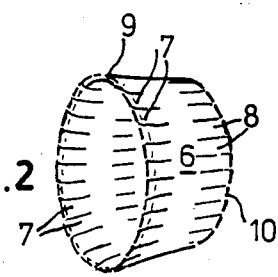
FIG. 2 is a perspective of the spring segment sleeve thereof per se and to a smaller scale.
Figure 3:
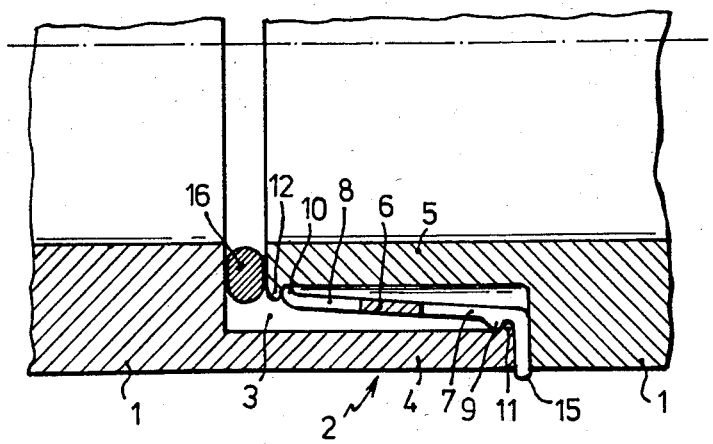
FIG. 3 is an axial section of another embodiment of the coupling.

As represented in the figures two tube sections 1, 1 to be connected are coupled by means of a snap coupling 2 which in a substantially axial recess 3 between the outer end 4 of one tube section 1 and the inner end 5 of the other tube section 1 has a somewhat tapered spring segment sleeve 6 which spring segment sleeve 6 has outer and inner spring segments or fingers 7 and 8, respectively.

The spring fingers 7 and 8 have at their free end preferably upturned, and downturned, respectively, edges 9 and 10, over which matching shoulders 11 and 12 on the respective tube ends 5 and 6 when simply pushing said tube ends 5, 6 onto each other are to be snapped. In the snap action the spring fingers 7 and 8 can give way canting but again by itself sliding loose of the tube ends 5 and 6 is impossible as the spring fingers 7 and 8 then cant in such a direction that they do act as a blocking.

Again forcedly releasing each of the outer spring fingers 7 for disconnecting the tube sections 1, 1 can take place by means of tap screws 14 threaded through screw openings 13 through the wall of the outer tube end 4, with the inner fingers 8 then turning along due to the stiffness of the sleeve 6, or by means of an also segmental flange 15 formed on the outer end of the spring segment sleeve 6, with said flange somewhat outwardly projecting and to be moved inwardly with a (not represented) oppressible hoop around the tube for forcedly loosening the snap edges 9–12 from each other.

The sealing at the coupling 2 is to be effected by means of a gland or annular seal 16 which as represented is sealingly compressed under the snap action.

It is observed that of course still further embodiments of the here represented snap coupling are possible within the scope of the invention.

I claim:

1. A tube coupling including two tube sections of substantially equal outer diameter throughout the area at which coupling takes place one end of one of said tube sections inserted into an opposed end of the other tube section, said tube ends comprising a substantially axial recess (3) formed between ends (4,5) of said coupled tube sections (1,1), and a shoulder formed on the outer and inner tube end projecting into said recess, a spring segment sleeve (6) therein, said sleeve including spring segments (7,8) which are outwardly and inwardly somewhat tapered with respect to outer and inner tube ends; the ends (9,10) of said spring segments (7,8) being adapted to lock and abut against said shoulder (11,12) on the outer (4) and the inner (5), respectively, of the tube ends (4,5) under snap action to hold the tube ends (4,5) together and wherein one of said spring segments bears a flange (15) adapted to be caught between the tube sections and project outwardly therefrom when said tube ends are fixed whereby when said flange is radially pressed inwardly said spring segment which bears the flange is moved away from its abutment against the shoulder so that disconnection of the tube sections (1,1) can be effected.

2. A tube coupling according to claim 1 wherein an annular seal (16) is compressible between the tube sections.

3. A tube coupling between adjoining flush tube ends of two tubes, the outer diameters as well as the inner diameters of which are substantially equal, the first of said tube ends having its inner periphery deeply recessed over a predetermined axial distance from its own terminal end and the second of said tube ends having its outer periphery deeply recessed over a predetermined axial distance from its terminal end to such substantial recessed depths and lengths that when said first and second tube ends are positioned over one another between said first and second tube ends a substantially axially extending chamber of some depth is formed which is adapted to receive therein a spring element sleeve which is outwardly and inwardly somewhat tapered with respect to said first and second tube ends, and an inwardly turned edge formed on said first tube end and an outwardly turned edge formed on said second tube end, each said edge projecting into said chamber, and the opposite terminal ends of said sleeve having respectively outwardly and inwardly turned edges to snap-lock over said respectively inwardly and outwardly turned edges on said terminal ends of said first and second tube ends, and said spring segment sleeve having a flange thereon projecting outwardly between said tubes so that by radially pressing said flange inwardly said spring section which bears the flange is moved away from its abutment against the shoulder so that disconnection of said tubes is effected.

4. A tube coupling according to claim 3 wherein an annular seal (16) is compressible between the tube sections.

* * * * *